United States Patent
Hoffman

(10) Patent No.: US 9,551,206 B2
(45) Date of Patent: Jan. 24, 2017

(54) POOL, LARGE TANK, OR POND EXCHANGER

(71) Applicant: Hydra Heating Industries, LLC, Atlanta, GA (US)

(72) Inventor: Michael Hoffman, Atlanta, GA (US)

(73) Assignee: HYDRA HEATING INDUSTRIES, LLC, Atlanta, GA (US)

( * ) Notice: Subject to any disclaimer, the term of this patent is extended or adjusted under 35 U.S.C. 154(b) by 0 days.

(21) Appl. No.: 14/526,188

(22) Filed: Oct. 28, 2014

(65) Prior Publication Data

US 2015/0129162 A1 May 14, 2015

Related U.S. Application Data

(60) Provisional application No. 61/902,311, filed on Nov. 11, 2013, provisional application No. 62/041,104, filed on Aug. 24, 2014, provisional application No. 62/044,266, filed on Aug. 31, 2014.

(51) Int. Cl.

| | |
|---|---|
| *F28D 1/02* | (2006.01) |
| *E21B 43/24* | (2006.01) |
| *F28C 3/04* | (2006.01) |
| *F01K 5/02* | (2006.01) |
| *B60P 3/22* | (2006.01) |
| *F28F 9/013* | (2006.01) |

(52) U.S. Cl.
CPC ............. *E21B 43/2405* (2013.01); *F01K 5/02* (2013.01); *F28C 3/04* (2013.01); *F28D 1/022* (2013.01); *F28D 1/0213* (2013.01); *B60P 3/2295* (2013.01); *F28F 9/013* (2013.01)

(58) Field of Classification Search
CPC ........ E04H 4/129; F28D 1/0213; F22B 1/021; Y02E 10/44; F24H 1/208; F24H 1/403
USPC ........ 239/548, 550, 565, 567, 589, 124, 128
See application file for complete search history.

(56) References Cited

U.S. PATENT DOCUMENTS

| | | | | |
|---|---|---|---|---|
| 1,614,430 | A * | 1/1927 | Mart ...................... | A01G 25/00 239/267 |
| 1,821,229 | A * | 9/1931 | Mullett .................. | A47K 3/283 137/602 |
| 4,101,987 | A * | 7/1978 | Gagnon .................... | E04H 4/06 4/504 |
| 4,502,392 | A | 3/1985 | Rosenberger | |

(Continued)

OTHER PUBLICATIONS

International Search Report and Written Opinion, dated Mar. 26, 2015 for PCT/US2014/063468.

*Primary Examiner* — Janie Loeppke
(74) *Attorney, Agent, or Firm* — Thomas|Horstemeyer, LLP.

(57) ABSTRACT

An exchanger for a pool, large storage tank, or pond is described herein. In one embodiment, the exchanger includes a diffuser hub, exchanger extension arms that extend radially outward from the diffuser hub, one or more exchanger rings that intersect with the heat exchanger extension arms, and a fill tube that extends to the diffuser hub. One or both of the heat exchanger arms and/or the exchanger rings include fluid apertures that direct fluid into the pool. Fluid pumped into the fill tube may flow through into the diffuser, through the exchanger extension arms and/or the one or more exchanger rings, and out through the fluid apertures at various locations into the pool. As such, heated fluid, or fluid to be mixed, for example, may be more evenly and quickly distributed into the pool.

20 Claims, 5 Drawing Sheets

(56) References Cited

U.S. PATENT DOCUMENTS

| | | | |
|---|---|---|---|
| 4,569,805 A | | 2/1986 | Hume et al. |
| 4,893,362 A | * | 1/1990 | Murphy ............. A61H 33/0087 4/493 |
| 6,419,009 B1 | * | 7/2002 | Gregory ................. F28D 1/053 165/144 |
| 7,797,770 B2 | * | 9/2010 | Lau ........................ A61H 33/02 4/541.1 |
| 8,387,805 B2 | | 3/2013 | Olivier |
| 2005/0211802 A1 | * | 9/2005 | Newton ................. F16L 41/03 239/548 |
| 2010/0025407 A1 | | 2/2010 | Benson |
| 2013/0150268 A1 | | 6/2013 | Oldham |

\* cited by examiner

POOL, LARGE TANK, OR POND EXCHANGER

CROSS-REFERENCE TO RELATED APPLICATIONS

This application claims the benefit of U.S. Provisional Application No. 61/902,311, filed Nov. 11, 2013, titled "Sparge Heating System for Frac Water Tanks," U.S. Provisional Application No. 62/044,266, filed Aug. 31, 2014, titled "Heat Exchanger for Frac Pools and Ponds," and U.S. Provisional Application No. 62/041,104, filed Aug. 24, 2014, titled "Heat Exchanger for Frac Tanks," the entire contents of each of these applications is hereby incorporated herein by reference.

BACKGROUND

Pools or ponds may be embodied in a variety of configurations and sizes. Some pools are round with metal segmented sides, while others may be formed having oblong, crescent, circular, oval, half-moon, semi-circle or irregular rounded shapes. Still others may have rectangular, square, rounded square, trilateral, quadrilateral, or other multiple-sided, regular or irregular shapes. The sides may be rigid or collapsible, temporary or permanent. The pools or ponds may be above ground, underground, or in ground.

Such pools or ponds may be used to provide storage for fluid at various locations, such as at drilling sites for oil and gas wells, manufacturing facilities, warehouses, user facilities (e.g., biodiesel storage for farms), trans loading facilities, municipal and public works locations, etc.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

Figure 1:
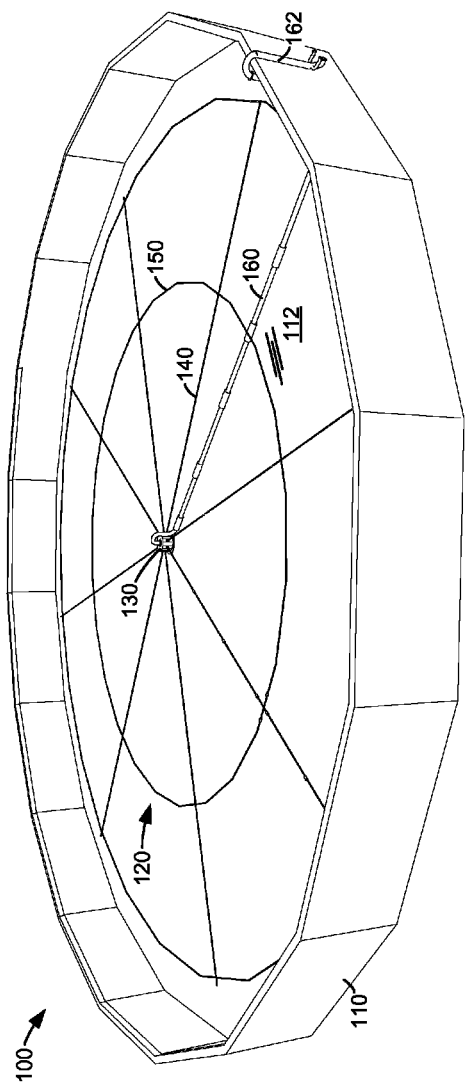
FIG. 1 illustrates a perspective view of a pool with an example exchanger according to one embodiment of the present disclosure.

As noted above, pools or tanks may be used to provide storage for fluid at various locations such as drilling sites for oil and gas wells, for example. A pool may be erected at a location proximate to a drilling site, for example, and used to store water or other fluids used in drilling processes. Once erected, a pool can be filled with fluid for storage, processing, and dispensing. Examples of fluids that may be stored in a pool include fracking liquids, drilling mud, fluids from environmental cleanup, water, brine, etc. As used herein, the term "fluid" includes any material or composition of materials of suitable viscosity to flow into and/or out of a pool, with or without pumping. Thus, the term "fluid" is intended to include any flowing mixture, suspension, slurry, or combination of materials.

Depending upon the needs at the site, it may be desirable or necessary to heat the fluid stored in a pool. For example, in hydraulic fracturing, heated fluid is pumped into wells to stimulate the wells for the removal of oil and/or gas deposits. However, because of the size of the pool and the volume of fluid that may be stored in the pool, it may be difficult to evenly disperse or diffuse heated fluid throughout the pool if the fluid is merely fed into a fill tube at the pool. Further, depending upon the needs at the site, it may be desirable or necessary to mix the fluid stored in a pool with another material. For example, in diesel exhaust fluid, urea is mixed with water. Without an exchanger as described herein, it may be difficult to evenly disperse or diffuse and mix fluid throughout the pool if the fluid is merely fed into a fill tube at the pool.

If fluid is circulated from the pool, heated by a fluid heater, and then fed back into a fill tube of the pool, the fluid surrounding the fill tube may become relatively warmer in the pool while fluid further away from the fill tube may remain relatively cooler. This manner of injecting a heated fluid into the pool is, thus, a relatively inefficient and ineffective method of heating the fluid in the pool, wasting time and resources.

In the context described above, a heat exchanger is described herein. The heat exchanger may be relied upon in a pool, for example, to more evenly distribute and diffuse fluid into the pool. When a heated fluid is pumped into the pool, the heat exchanger helps to more evenly distribute and diffuse the heated fluid into the pool. Overall, the volume of fluid in the pool may be more evenly and quickly brought to a desired temperature when using the heat exchanger. Further, it may require less fuel to heat the fluid in the pool. Thus, the heat exchanger may be relied upon in a pool to save time and resources when heating fracking liquids, for example, or other fluids that may be stored in the pool. The same principles apply when using the exchanger for mixing fluids. The exchanger may also be used to promote or reduce phase change in fluids, to cool fluids or gasses that are too hot, and/or to heat phase changed materials (e.g. turning ice to water).

As described in further detail below, the heat exchanger includes a diffuser hub located proximate to a center of a pool, heat exchanger extension arms that extend radially outward from the diffuser hub toward a wall of the pool, one or more heat exchanger rings that intersect with the heat exchanger extension arms, and a fill tube that extends from the pool wall to the diffuser hub. In one aspect of the embodiments, one or both of the heat exchanger arms and/or the one or more exchanger rings include fluid apertures that direct fluid into the pool. Further, in one embodiment, the diffuser hub includes a cylindrical housing that surrounds an interior space, a fill tube inlet through a top of the cylindrical housing, a cylindrical diffuser ring that extends from the top of the cylindrical housing into a portion of the interior space, and one or more flanges in sides of the cylindrical housing. The one or more flanges may be relied upon to secure the heat exchanger arms in fluid communication with the interior space of the diffuser hub.

Turning now to the drawings, various structural and functional aspects of the embodiments are described in further detail.

FIG. 1 illustrates a perspective view of a pool 100 with an example exchanger 120 according to one embodiment of the present disclosure. The pool 100 includes pool walls 110 and pool floor 112. The pool walls 110 may be formed from steel or any other material suitable for holding and retaining fluid in the pool 100. When erected, the pool walls 110 may be installed over leveled earth or other substrata as required by the pool installer and manufacturer. Once the pool walls 110 are installed, a liner may be inserted into the pool 100 to help retain water in the pool 100. Thus, the pool floor 112 may comprise a liner placed over leveled earth or other substrata as the pool erector requires or uses.

The exchanger 120 may be referred to as a heat exchanger because it may be relied upon to evenly distribute or disperse heated fluid throughout the pool 100. It should be appreciated, however, that the exchanger 120 may be relied upon to evenly distribute any type of fluid throughout the pool 100. For example, the exchanger 120 may be relied upon to evenly distribute or disperse a brine solution having a higher concentration of salt into fresh water stored within the pool 100. Further, it should be appreciated that the pool 100 illustrated in FIG. 1 is provided by way of example only. In other words, the embodiments of exchangers described herein may be used in any type of storage pool, and the pool 100 is only representative of one type of storage pool in which the exchangers may be used.

The exchanger 120 in FIG. 1 includes a diffuser hub 130 located proximate to a center of the pool 100, exchanger extension arms 140 that extend radially outward from the diffuser hub 130 toward the pool walls 110, one or more exchanger rings 150 that intersect with the exchanger extension arms 140, and a fill tube 160 that extends from the pool walls 110 to the diffuser hub 130. Among embodiments, the exchanger 120 may include any number of exchanger extension arms 140 arranged in various positions and/or locations within the pool 100 and any number of exchanger rings 150 arranged in various positions and/or locations within the pool 100. While not shown, valves or orifices may be used to control fluid flow through the exchanger arms 140 and/or the exchanger rings 150. In this way, some of the exchanger arms 140 and/or the exchanger rings 150 may have reduced flow, others may be cut off, and others may have increased flow.

In one aspect of the embodiments, one or both of the exchanger arms 140 and/or the exchanger rings 150 include fluid apertures that direct fluid into the pool 100. Further, as described in additional detail below with reference to FIGS. 4 and 5, the diffuser hub 130 includes a cylindrical housing that surrounds an interior space, a fill tube inlet through the cylindrical housing, a cylindrical diffuser ring that extends within the interior space of the diffuser hub 130, and one or more flanges, cam locks, welds, welded butt joints or other means of penetrating the diffuser hub 130 and attaching radiant pipes or tubes in sides of the cylindrical housing of the diffuser hub 130. The flanges may be relied upon to secure the exchanger arms 140 in fluid communication with the interior space of the diffuser hub 130.

As also illustrated in FIG. 1, the exchanger 120 includes a snorkel 162 that extends from outside the pool 100, over the pool wall 110, and into an interior fluid storage space of the pool 100. The snorkel 162 may be embodied as a pipe or tube for directing fluid and be connected in fluid communication with the fill tube 160. In various embodiments, the snorkel 162 may include one or more inlet openings of various sizes for providing a supply of fluid to the pool 100. The inlet openings of the snorkel 162 may be connected to pipes, hoses, or tubes of various diameters. The pipes or hoses may be of rigid construction or collapsible. Such collapsible hoses may be embodied as flat hoses, such as fire hoses, etc.

The exchanger extension arms 140 and exchanger rings 150 may be embodied as straight or curved tubes or pipes formed from aluminum, carbon, stainless or other metals, metallic alloys, plastic, or any other material suitable for the application of directing fluid. In other embodiments, the exchanger extension arms 140 and exchanger rings 150 may be embodied as hoses, such as flat hoses, for example, formed from a combination of nylon fabric, rubber, etc. Although being rigid in some embodiments, the exchanger extension arms 140 and exchanger rings 150 may be mounted in place using pipe sleeves or buoys to protect the floor of the pool or pond, for example. The exchanger extension arms 140 and exchanger rings 150 may be mechanically secured together in fluid communication with each other using one or more joints or joining members. The joints may include male-to-female threaded connections, flanges, etc., to join and secure the exchanger extension arms 140 and exchanger rings 150 together. As necessary, fastening means, such as bolts and nuts, locking pins, epoxy, various glues, compression joints, etc. may also be relied upon to join and secure the exchanger extension arms 140 and exchanger rings 150 together. It also should be appreciated that exchanger extension arms 140 and exchanger rings 150 may be formed from several smaller segments of tubes. In some embodiments, one or more gaskets may be placed between segments of the exchanger extension arms 140 and exchanger rings 150, to help prevent fluid from leaking between junctures in the exchanger 120. Valves, orifices or other devices may be used to reduce or increase flow through the extension arms as needed for the particular use at hand. For example, an irregular shape may require less flow in shorter exchanger arms and more flow in longer exchanger arms.

In operation, fluid may be pumped into the snorkel 162 and, thus, into the fill tube 160 of the exchanger 120. In turn, the fluid will be directed into the diffuser hub 130 toward the center of the pool 100. From the diffuser hub 130, the fluid will be directed into the exchanger extension arms 156 and/or the exchanger rings 150 and, ultimately, out from fluid apertures in the exchanger extension arms 156 and/or the exchanger rings 150. The fluid apertures may be positioned relatively evenly across the exchanger extension arms 156 and/or the exchanger rings 150 and direct fluid into the pool 100 at various spaced-apart locations. As such, heated fluid, for example, may be more evenly distributed into the pool 100. The fluid apertures may be sized regularly or they may be smaller or larger as is useful for the operation of the exchanger 120. For example, smaller apertures may be located closer to the diffuser hub 130 and larger holes may be located further away from the diffuser hub 130.

FIG. 2A illustrates a closer perspective view of a portion of the example exchanger 120 in FIG. 1 according to one embodiment of the present disclosure. In FIG. 2A, the path or route of the fill tube 160 within the pool 100 is shown as tracking or extending along the pool floor 112, routing up along a side of the diffuser hub 130, and being connected to a fill tube inlet at the top of the diffuser hub 130. In other embodiments, such as that described below with reference to FIG. 3, the fill tube 160 may be routed in alternative ways.

Figure 2:
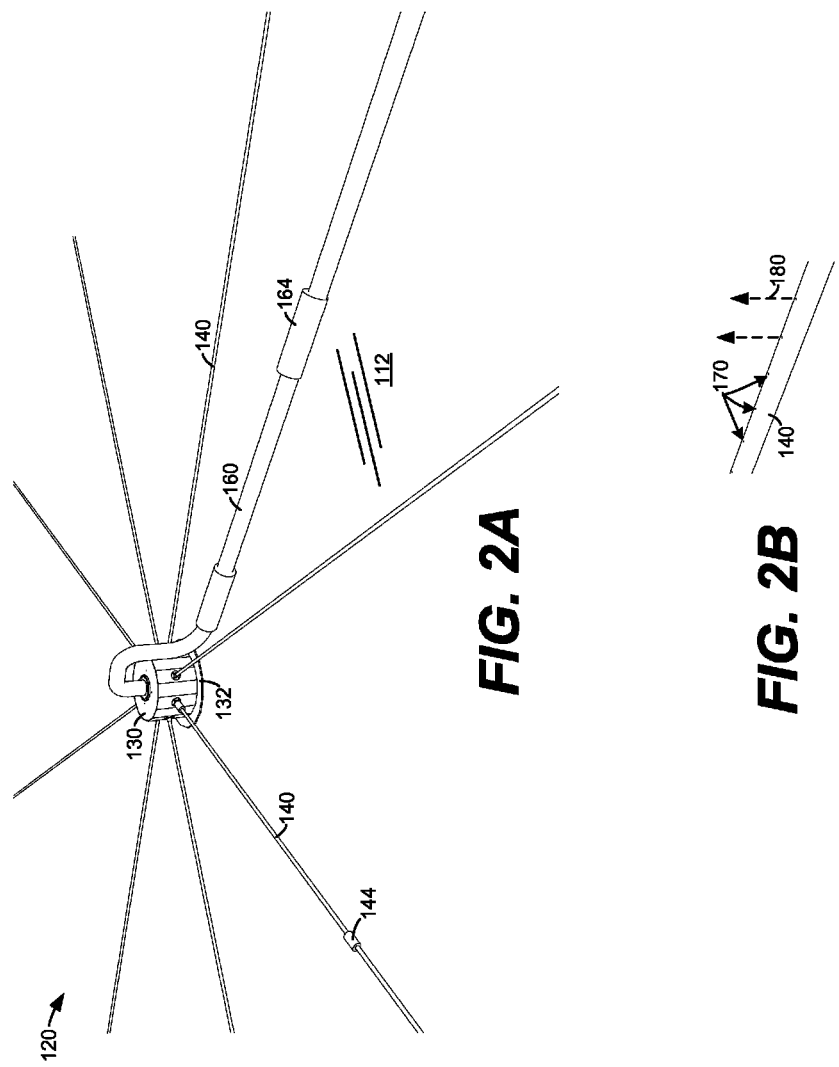
FIG. 2A illustrates a closer perspective view of a portion of the example exchanger in FIG. 1 according to one embodiment of the present disclosure.
FIG. 2B illustrates a closer perspective view of an exchanger extension arm of the example exchanger in FIG. 1 including fluid apertures according to one embodiment of the present disclosure.

As illustrated in FIG. 2, the exchanger 120 may include one or more fill tube bumpers 164 interposed between the fill tube 160 and the floor 112 of the pool 100 (see also FIG. 1). Additionally, the exchanger 120 may include one or more extension arm bumpers 144 interposed between one or more of the exchanger arms 140 and the pool floor. The bumpers 144 and 164 may be embodied as foam, rubber, etc., and may wrap around a portion or entire outer surface of the exchanger arms 140 and/or the fill tube 160. Generally, the bumpers 144 and 164 may be relied upon to help prevent the exchanger arms 140 and/or the fill tube 160 from wearing, rubbing, cutting or tearing the liner of the pool 100. Additionally, although not illustrated, the exchanger 120 may also include bumpers similar to the bumpers 144 and 164 interposed between one or more of the exchanger rings 150 and the floor 112 of the pool 100 (see also FIG. 1).

FIG. 2B illustrates a closer perspective view of an exchanger extension arm 140 of the example exchanger 120 in FIG. 1 including fluid apertures 170 according to one embodiment of the present disclosure. In FIG. 2B, the fluid apertures 170 in the exchanger extension arm 140 are more clearly shown. Generally, the fluid apertures 170 direct fluid from within the exchanger extension arm 140 into the pool 100. In this context, example jets 180 of fluid being directed upward into the pool 100 are illustrated in FIG. 2B. In one embodiment, the fluid apertures 170 may be embodied as holes from outside to an internal hollow center of the exchanger extension arm 140. The fluid apertures 170 may be formed by drilling or cutting holes in the exchanger extension arm 140, for example, or by any other suitable manner. In other embodiments, the fluid apertures 170 may be formed as venturi nozzles (or other types of nozzles or apertures) in or on the exchanger extension arm 140. In this case, the nozzles may help agitate or distribute fluid in the pool 100.

As shown, the fluid apertures 170 are formed inline and are spaced substantially evenly apart (e.g., uniformly apart) along the exchanger extension arm 140 at a 12 o'clock orientation. In other embodiments, however, the fluid apertures 170 may be formed at other orientations (e.g. at 8, 10, 2, or 4 o'clock orientations or combinations thereof) or staggered orientations and/or positions (e.g., non-uniformly) over the surface of the exchanger extension arm 140. For example, one or more of the fluid apertures 170 may be formed at various angles from the top or bottom of the exchanger extension arm 140. Fluid apertures 170 formed to direct fluid out toward the bottom of the exchanger extension arms 140 may be relied upon to stir or mix particles that may settle upon the pool floor 112. In other aspects of the embodiments, the exchanger extension arm 140 may include weep holes oriented toward the bottom to permit any remaining water to slowly drip out and prevent freezing, etc. It should also be appreciated that apertures similar to the fluid apertures 170 may be formed in any of the extension arms 140 and/or the exchanger rings 150 in the exchanger 120.

Figure 3:
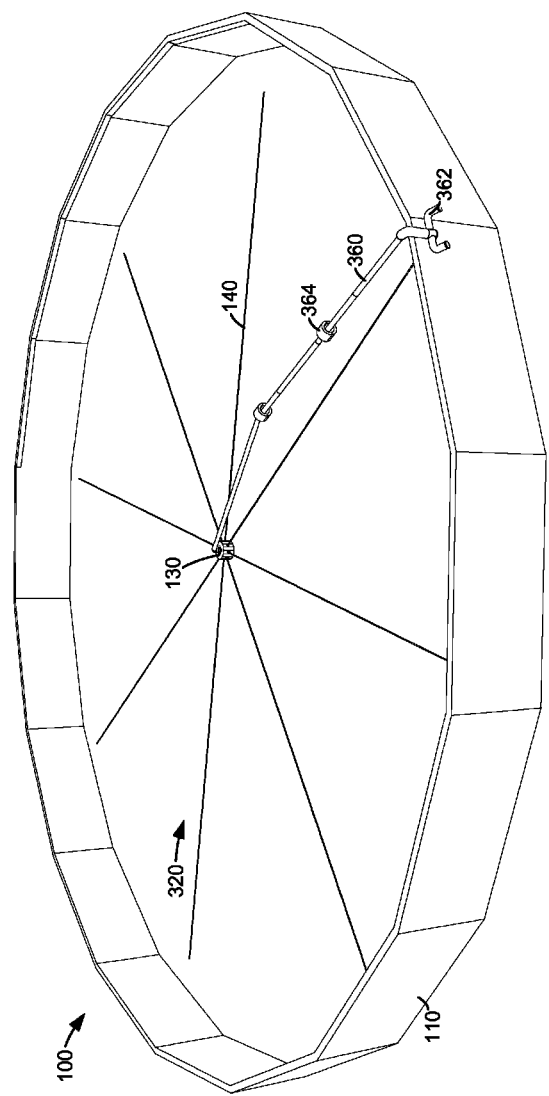
FIG. 3 illustrates a perspective view of the pool in FIG. 1 with another example exchanger according to one embodiment of the present disclosure.

FIG. 3 illustrates a perspective view of the pool 100 in FIG. 1 with another example exchanger 320 according to one embodiment of the present disclosure. As compared to the exchanger 120 in FIG. 1, the exchanger 320 includes the fill tube 360 rather than the fill tube 160, includes the snorkel 362 rather than the snorkel 162, and omits the exchanger rings 150. Rather than being routed along the pool floor 112, the fill tube 320 is routed along the surface of any fluid in the pool 100 before being connected to the fill tube inlet through the top of the diffuser hub 130. In this context, the exchanger 320 includes buoys 364 that hold the fill tube 360 up along the surface of any fluid in the pool 100. The snorkel 362 is similar to the snorkel 162 but does not curve as far into the interior fluid storage space of the pool 100 or extend as far down to the ground. In various embodiments, the snorkel 362 could extend as far down to the ground as is useful and practical for the operators.

Figure 4:
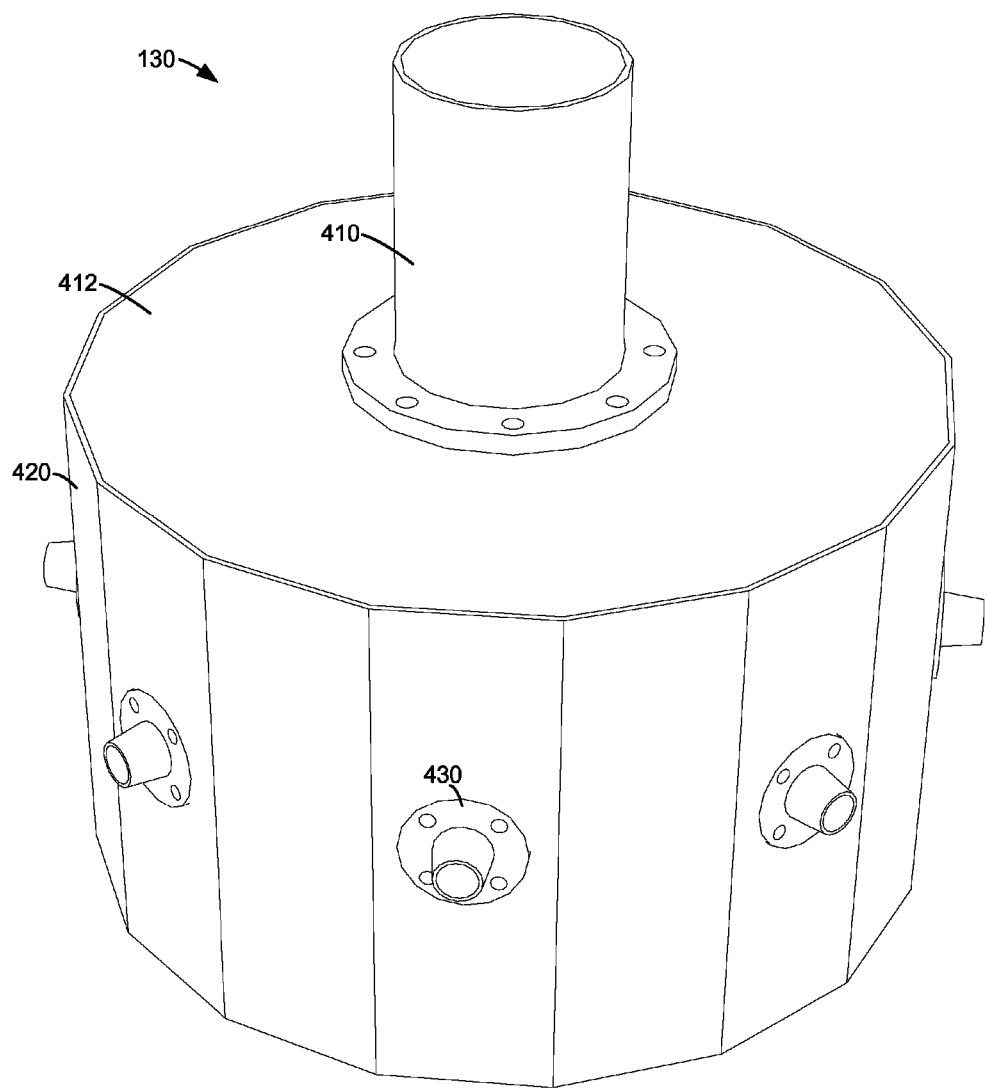
FIG. 4 illustrates a perspective view of a diffuser hub of the exchangers in FIGS. 1-3 according to one embodiment of the present disclosure.

FIG. 4 illustrates a perspective view of the diffuser hub 130 of the exchangers in FIGS. 1-3 according to one embodiment of the present disclosure. The diffuser hub 130 The diffuser hub 130 includes a cylindrical housing 420 that surrounds an interior space, a fill tube inlet 410 through a top 412 in the cylindrical housing 420, and one or more flanges 430 in sides of the cylindrical housing 420 of the diffuser hub 130. The fill tube inlet 410 may be relied upon to secure the fill tube 160 in fluid communication with the interior space of the diffuser hub. Similarly, the flanges 420 (or any other suitable fluid connection means) may be relied upon to secure the exchanger arms 140 in fluid communication with the interior space of the diffuser hub 130. In some embodiments, the diffuser hub 130 may comprise a type of pressure vessel.

The diffuser hub 130 may be formed or constructed from any suitable material, such as sheet metal, plastic, or any other material suitable for the application of holding and directing fluid. The cylindrical housing 420 may be formed as a multi-sided cylindrically-shaped vessel by welding several segments of sheet metal together in a circular shape. The diffuser hub 130 may be cylindrical or spherical in shape. It may be rounded in shape like a pressure vessel with a domed top and bottom in some embodiments. It may include three sides in one embodiment with rounded edges or corners between the sides. Also, in various embodiments, the diffuser hub 130 may have as many apertures as it can structurally allow. A hole may be cut through the top 412 of the diffuser hub 130 for the installation of the fill tube inlet 410. Similarly, holes may be cut through the cylindrical housing 420 at various locations for the installation of the flanges 430. As discussed above, the flanges 430 may be relied upon to secure the exchanger arms 140 (FIGS. 1-3) in fluid communication with the interior space of the diffuser hub 130. In one embodiment, the flanges 430 may be evenly spaced around the cylindrical housing 420, but it should be appreciated that the flanges 430 may be provided at any location and height around the cylindrical housing 420.

Figure 5:
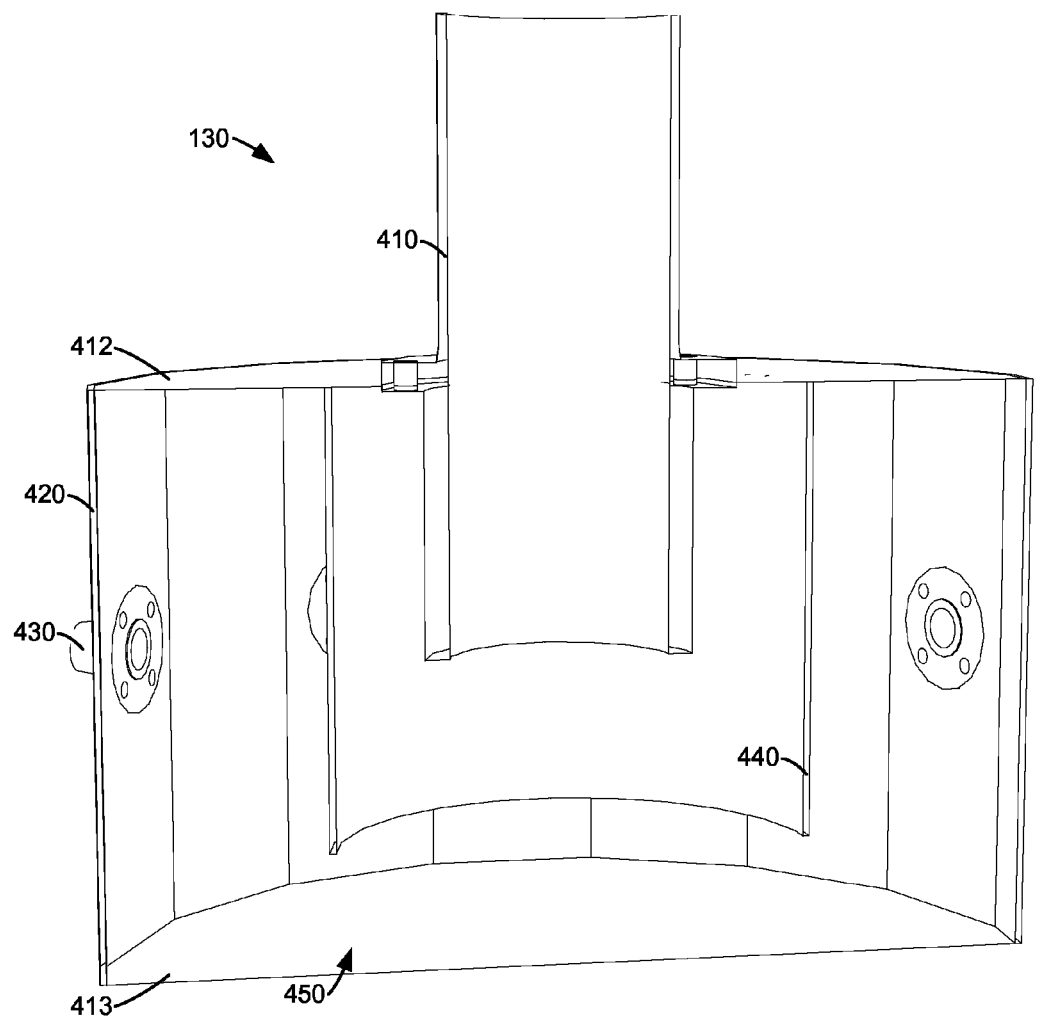
FIG. 5 illustrates a perspective sectional view of the diffuser hub of the exchangers in FIGS. 1-3 according to one embodiment of the present disclosure.

FIG. 5 illustrates a perspective sectional view of the diffuser hub 130 of the exchangers in FIGS. 1-3 according to one embodiment of the present disclosure. In FIG. 5, the interior space 450 of the diffuser hub 130 is shown along with a bottom 413 of the cylindrical housing 420. Further, a cylindrical diffuser ring 440 that extends from the top 412 of the cylindrical housing 420 into a portion of the interior space 450 is illustrated. The cylindrical diffuser ring 440 may be relied upon to help mix or disperse fluid within the interior space 450 before it is pumped out through the flanges 430 to the exchanger arms 140. The length of extension of the cylindrical diffuser ring 440 may depend, in part, upon whether fluid from the fill tube 160 directionally enters the interior space 450 of the diffuser hub 130.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A pond or pool heat exchanger or mixer, comprising:
   a pool comprising a pool wall and a pool floor that retain fluid;
   a heat exchanger that extends over at least a portion of the pool, the heat exchanger comprising:
      a diffuser hub located proximate to a center of the pool, the diffuser hub comprising:
         a cylindrical housing that surrounds an interior space; and
         a fill tube inlet that extends from outside the cylindrical housing, through a top of the cylindrical housing, and into the interior space;
      a plurality of heat exchanger extension arms, each of the plurality of heat exchanger extension arms extending radially outward from the diffuser hub toward the pool wall;
      at least one heat exchanger ring that intersects with at least one of the plurality of heat exchanger extension arms, the plurality of heat exchanger arms and the at least one exchanger ring having a plurality of fluid apertures that direct fluid into the pool; and
      a fill tube that extends from the pool wall to the fill tube inlet of the diffuser hub.

2. The pool heat exchanger of claim 1, wherein the diffuser hub comprises:
   a cylindrical diffuser ring that extends from the top of the cylindrical housing into a portion of the interior space; and
   a plurality of flanges in sides of the cylindrical housing, the plurality of flanges to secure the plurality of heat exchanger arms in fluid communication with the interior space of the diffuser hub.

3. The pool heat exchanger of claim 2, wherein the fill tube is connected in fluid communication with the fill tube inlet and supplies fluid to the heat exchanger to be diffused into the pool.

4. The pool heat exchanger of claim 1, further comprising at least one extension arm bumper interposed between at least one of the plurality of heat exchanger arms and the pool floor.

5. The pool heat exchanger of claim 1, further comprising at least one fill tube bumper interposed between the fill tube and the floor of the pool.

6. The pool heat exchanger of claim 1, further comprising a snorkel that extends over the pool wall and supplies fluid to the fill tube.

7. An exchanger, comprising:
   a diffuser hub comprising:
      a housing that surrounds an interior space;
      a fill tube inlet that extends from outside the housing, through a top of the housing, and into the interior space; and
      a plurality of flanges in sides of the housing;
   a plurality of exchanger extension arms extending radially outward from the plurality of flanges of the diffuser hub and having a plurality of fluid apertures that direct fluid into a pool; and
   a fill tube that extends from a pool wall to the fill tube inlet of the diffuser hub.

8. The exchanger of claim 7, wherein the diffuser hub further comprises a cylindrical diffuser ring that extends from a top of the housing into a portion of the interior space.

9. The exchanger of claim 7, further comprising at least one exchanger ring that intersects with at least one of the plurality of exchanger extension arms.

10. The exchanger of claim 9, wherein the at least one exchanger ring includes a plurality of fluid apertures that direct fluid into the pool.

11. The exchanger of claim 9, wherein the fill tube is connected in fluid communication with the fill tube inlet and supplies fluid to the exchanger to be diffused into the pool.

12. The exchanger of claim 9, further comprising at least one extension arm bumper interposed between at least one of the plurality of exchanger arms and a floor of the pool.

13. The exchanger of claim 9, further comprising at least one fill tube bumper interposed between the fill tube and a floor of the pool.

14. The exchanger of claim 9, further comprising a mat interposed between the diffuser hub and a floor of the pool.

15. The exchanger of claim 9, further comprising a snorkel that extends over the pool wall and supplies fluid to the fill tube.

16. A pond or pool heat exchanger or mixer, comprising:
   a pool comprising a pool wall and a pool floor that retain fluid;
   a heat exchanger that extends over at least a portion of the pool, the heat exchanger comprising:
      a diffuser hub located proximate to a center of the pool, the diffuser hub comprising:
         a housing that surrounds an interior space; and
         a fill tube inlet that extends from outside the housing, through a top of the housing, and into the interior space;
      a plurality of heat exchanger extension arms, each of the plurality of heat exchanger extension arms extending radially outward from the diffuser hub toward the pool wall; and
      a fill tube that extends from the pool wall to the fill tube inlet of the the diffuser hub.

17. The pool heat exchanger of claim 16, wherein the diffuser hub further comprises a cylindrical diffuser ring that extends from the top of the housing into a portion of the interior space.

18. The pool heat exchanger of claim 16, further comprising at least one heat exchanger ring that intersects with at least one of the plurality of heat exchanger extension arms, the at least one exchanger ring having a plurality of fluid apertures that direct fluid into the pool.

19. The pool heat exchanger of claim 16, wherein the fill tube is connected in fluid communication with the fill tube inlet and supplies fluid to the heat exchanger to be diffused into the pool.

20. The pool heat exchanger of claim 16, further comprising at least one bumper interposed between at least one of the plurality of heat exchanger arms and the floor of the pool or between the fill tube and the floor of the pool.

* * * * *